(12) United States Patent
Arimachi et al.

(10) Patent No.: US 10,870,539 B2
(45) Date of Patent: Dec. 22, 2020

(54) BELT HAVING PROTRUSION FORMED THEREON

(71) Applicant: Mitsuboshi Belting Ltd., Kobe (JP)

(72) Inventors: Kentaro Arimachi, Hyogo (JP); Akira Takenaka, Hyogo (JP); Takahide Okazawa, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 16/627,557

(22) PCT Filed: Jun. 28, 2018

(86) PCT No.: PCT/JP2018/024698
§ 371 (c)(1),
(2) Date: Dec. 30, 2019

(87) PCT Pub. No.: WO2019/004389
PCT Pub. Date: Jan. 3, 2019

(65) Prior Publication Data
US 2020/0216267 A1 Jul. 9, 2020

(30) Foreign Application Priority Data

Jun. 30, 2017 (JP) ................................. 2017-129812
Jun. 26, 2018 (JP) ................................. 2018-120775

(51) Int. Cl.
*B65G 15/30* (2006.01)
*B65G 15/32* (2006.01)
(Continued)

(52) U.S. Cl.
CPC .................................... *B65G 15/42* (2013.01)

(58) Field of Classification Search
None
See application file for complete search history.

(56) References Cited

U.S. PATENT DOCUMENTS 3,921,376 A 11/1975 Hofer
4,697,693 A * 10/1987 Rajala .................... B65G 15/42
198/698

(Continued)

FOREIGN PATENT DOCUMENTS

CN 202369052 U 8/2012
CN 203532427 U 4/2014
(Continued)

OTHER PUBLICATIONS

Feb. 24, 2020—(TW) Office Action—App 107122655.
(Continued)

*Primary Examiner* — Kavel Singh
(74) *Attorney, Agent, or Firm* — Banner & Witcoff, Ltd.

(57) ABSTRACT

The present invention relates to a belt with a protrusion, including: a belt main body including tooth portions at a predetermined tooth pitch on an inner surface of the belt in a longitudinal direction, and a cord extending in the longitudinal direction and arranged at a predetermined cord pitch in a width direction; and a protruding portion formed on a back surface of the belt main body by an integral formation, in which: the cord has a fineness of 900 to 1100 deniers, and a ratio of a total of intervals between the adjacent cords to a belt width of 12 to 45%; and the protruding portion is arranged outside the tooth portions, has a hardness of 81 to 91 degrees, and has a base width smaller than the tooth pitch.

7 Claims, 5 Drawing Sheets

(51) Int. Cl.
 *B65G 15/00* (2006.01)
 *B65G 15/42* (2006.01)

(56) References Cited

U.S. PATENT DOCUMENTS

| | | | | | |
|---|---|---|---|---|---|
| 5,609,243 | A | * | 3/1997 | Fujita | B65G 15/34 198/847 |
| 5,853,849 | A | * | 12/1998 | Nishio | B32B 25/10 428/143 |
| 8,596,447 | B2 | * | 12/2013 | Gentz | B65G 15/52 198/731 |
| 2012/0165145 | A1 | | 6/2012 | Kitano et al. | |

FOREIGN PATENT DOCUMENTS

| | | |
|---|---|---|
| CN | 204038353 U | 12/2014 |
| CN | 102482036 B | 6/2015 |
| CN | 106429212 A | 2/2017 |
| JP | S50-013940 Y1 | 4/1975 |
| JP | H03-267211 A | 11/1991 |
| JP | H05-081120 A | 4/1993 |
| JP | H05-081120 U | 11/1993 |
| JP | H10-101209 A | 4/1998 |
| JP | 2001-122415 A | 5/2001 |
| JP | 2006-076016 A | 3/2006 |
| JP | 2006-298644 A | 11/2006 |
| JP | 2010-001959 A | 1/2010 |
| WO | 2011-027380 A1 | 3/2011 |
| WO | 2017-099756 A1 | 6/2017 |

OTHER PUBLICATIONS

Aug. 7, 2018—International Search Report—Intl App PCT/JP2018/024698.
Nov. 19, 2019—(JP) Notification of Reasons for Refusal—App 2018-120775.
Nov. 14, 2019—(Tw) Office Action—App 107122655.
Jul. 20, 2020—(JP) Notification of Reasons for Refusal—App 2018-120775.
Sep. 27, 2020—(CN) Notification of First Office Action—App 201880043117.4.

* cited by examiner

BELT HAVING PROTRUSION FORMED THEREON

CROSS REFERENCE TO RELATED APPLICATIONS

This is a U.S. National Phase Application under 35 U.S.C. § 371 of International Application No. PCT/JP2018/024698, filed Jun. 28, 2018, which claims priority to Japanese Application Nos. 2017-129812, filed Jun. 30, 2017 and 2018-120775, filed Jun. 26, 2018, which was published Under PCT Article 21(2), the entire contents of which are incorporated herein by reference.

TECHNICAL FIELD

The present invention relates to a belt with a protrusion having a protruding portion formed on a back surface of the belt main body by integral forming.

BACKGROUND ART

As a coin conveying device used in a cash processor (money change dispenser), etc. for paying changes and receiving deposits in a register, a conveying mechanism for placing coins thrown in a coin receiving port on a back surface of a flat belt or a toothed belt and conveying them is conventionally used. Since the coins are directly placed on the back surface, a problem such as a decrease in conveying ability caused by wear of the belt, deterioration of a polyurethane forming the belt due to a metal (copper, aluminum or the like), dirt, etc. occurs, and various improvements have been proposed.

As one of these proposals, a conveying mechanism in which the coins are not placed on the belt is considered. That is, a mechanism for transferring the coins by pushing them with a conveying member (for example, a resin member) arranged so as to bridge between two parallel belts is also proposed. In this conveying mechanism, protrusions for fitting and fixing the conveying member are provided on back surfaces of the two parallel belts, and the belts travel in synchronization with rotation of pulleys in a state where the conveying member is fixed.

As such a belt with a protrusion, it is considered to use a belt with a protrusion disclosed in Patent Document 1.

CITATION LIST

Patent Documents

Patent Document 1: JP-A-2001-122415

SUMMARY OF INVENTION

Technical Problem

Severe space-saving is required for a conveying mechanism for transferring coins by pushing them with a conveying member arranged so as to bridge between two parallel belts with protrusion. For this space-saving, it becomes necessary to decrease the pulley diameter and to narrow the belt width. In addition, in this mechanism, resistance against a load at the time of locking (a state where rotation is restrained by application of a sudden impact to the belt, when, for example, clogging of an object to be conveyed occurs during conveyance) also becomes necessary.

However, the belt with a protrusion as described in Patent Document 1 is one for conveying large articles. Therefore, there has been a problem that it cannot be applied to the space-saved conveying mechanism as it is.

For example, when the pulley diameter is decreased in this conveying mechanism, deformation stress applied to the belt during bending is more increased. Therefore, breakage of the belt due to bending fatigue of a cord becomes liable to occur. Further, in the case of forming a protrusion on a back surface of the belt, when a part where the protrusion is formed is wound on the pulley, it hardly becomes arcuate. Therefore, the breakage of the belt due to the bending fatigue of the cord in a base portion of the protrusion becomes much more liable to occur.

From the viewpoint of the resistance against the load at the time of locking, it is preferred that the protrusion has a high strength or a large size. However, on the other hand, the bending fatigue of the cord becomes remarkable. In this case, when the cord is made thin, bending fatigue resistance is improved, while the elastic modulus of the belt (cord) is decreased. When the elastic modulus is decreased, the belt cannot withstand the load at the time of locking, and becomes liable to have jumping (tooth skipping).

Accordingly, in order to apply the belt with a protrusion to the small diameter pulley, it has been a problem to achieve both the bending fatigue resistance and the resistance against the load at the time of locking (protrusion strength and resistance to jumping), which have a contradictory relation.

Accordingly, an object of the present invention is to provide a belt with a protrusion which copes with the space-saving of a conveying mechanism and is well balanced for withstanding a repeated conveyance.

Solution to Problem

In order to solve the above-described problems, a belt with a protrusion of the present invention is a belt with a protrusion, including:
  a belt main body including tooth portions at a predetermined tooth pitch on an inner surface of the belt in a longitudinal direction, and a cord extending in the longitudinal direction and arranged at a predetermined cord pitch in a width direction which is embedded in a back portion thereof; and
  a protruding portion formed on a back surface of the belt main body by an integral formation, in which:
  the cord has a fineness of 900 to 1100 deniers, and a ratio of a total of intervals between the adjacent cords to a belt width of 12 to 45%; and
  the protruding portion is arranged outside the tooth portion, has a hardness of 81 to 91 degrees (in accordance with Japanese Industrial Standards (JIS) K6253:2012, measured with an A-type hardness meter), and has a base width smaller than the tooth pitch.

The most preferred range of the fineness of the above-described cords is 950 to 1050 deniers, and the most preferred range of the ratio of the total of intervals between the adjacent cords to the belt width is 25 to 35%. In addition, the most preferred range of the hardness of the above-described protruding portion is 84 to 88.

According to the above-described constitution, arrangement of the cords is made dense by using the thin cords (900 to 1100 deniers, most preferably 950 to 1050 deniers) and decreasing the ratio of the total of intervals between the adjacent cords to the belt width (12 to 45%, most preferably 25 to 35%). Whereby, a balance between bending fatigue resistance and belt strength (resistance to jumping) is secured to cope with decreasing the pulley diameter and also to be able to cope with narrowing the belt width.

In addition, a balance between the bending fatigue resistance and resistance against a load at the time of locking (protrusion strength and the resistance to jumping) is secured by setting the hardness of the protruding portion to a predetermined range (81 to 91, the most preferred range is 84 to 88) and making the base width of the protruding portion smaller than the tooth pitch. Furthermore, also when the width of the belt is narrowed, the protruding portion secure such hardness that a conveying member can be sufficiently firmly held. Whereby, the occurrence of failure such as back surface cracks due to bending fatigue is prevented to cope with decreasing the pulley diameter and also to be able to cope with narrowing the belt width.

In the belt with a protrusion of the present invention, the cord preferably includes a polyester fiber. Durability to belt breakage is further improved by using the polyester fiber having high bending fatigue resistance.

In the belt with a protrusion of the present invention, the cord has a diameter of preferably 0.33 to 0.37 mm (most preferably 0.34 to 0.36 mm), the cord pitch is preferably 0.4 to 0.6 mm (most preferably 0.45 to 0.55 mm), and the interval between the adjacent cords is preferably 0.05 to 0.27 mm (most preferably 0.1 to 0.2 mm).

This constitution specifies, from another point of view, that the cords are thin and that the cord arrangement is dense. When the cords are within these ranges, the cords are applicable to cope with decreasing the pulley diameter and are more suitable for narrowing the belt width.

In the belt with a protrusion of the present invention, the belt width is preferably 3 to 5 mm, and the tooth pitch is preferably 2 to 3 mm.

This constitution shows suitable ranges that can cope with the narrow belt.

In the belt with a protrusion of the present invention, a ratio of the base width to the tooth pitch is preferably 66% or more and less than 100% (most preferably 75 to 90%).

According to this constitution, securing of flexibility and the bending fatigue resistance is ensured by specifying that the base width of the protruding portion is made smaller than the tooth pitch.

The belt with a protrusion of the present invention is suitably used, for example, in the following conveying mechanism.

That is, a conveying mechanism includes:

two or more belts with a protrusion of the present invention arranged in parallel;

a conveying member fitted and fixed to the protruding portions so as to bridge between the two or more belts with a protrusion; and a pulley on which the two or more belts with a protrusion are wound, in which:

the conveying mechanism is configured such that the conveying member pushes and transfers an object to be conveyed while the two or more belts with a protrusion circulate in synchronization with a rotation of the pulley.

The conveying mechanism using the belts with a protrusion of the present invention can cope with space-saving.

In the conveying mechanism using the belts with a protrusion of the present invention, the pulley preferably includes a pulley having a diameter of 7.6 to 19.1 mm and a number of teeth of 12 to 20.

This constitution shows suitable ranges that can cope with the small diameter pulleys.

Advantageous Effects of Invention

According to the present invention, it becomes possible to decrease the belt width and the pulley diameter, whereby an effect of being able to cope with space-saving of a conveying mechanism can be obtained.

BRIEF DESCRIPTION OF DRAWINGS (a) of FIG. 1 and (b) of FIG. 1 are a plan view and a front view of a conveying mechanism using belts with protrusions according to an embodiment of the present invention.

(a) of FIG. 2, (b) of FIG. 2 and (c) of FIG. 2 are a front view of the belt with protrusions of FIG. 1, an enlarged view of protruding portions and a perspective cross-sectional view of the belt, respectively.

Figure 5:
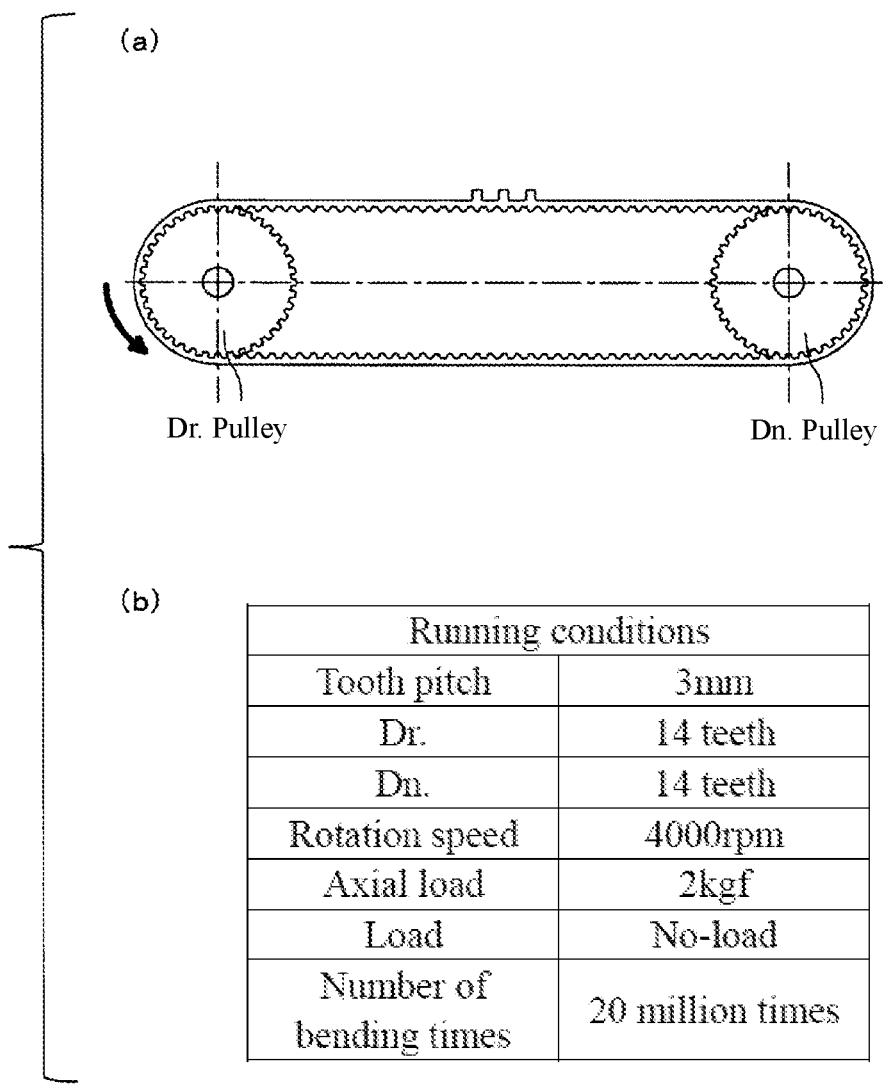

(a) of FIG. 5 and (b) of FIG. 5 show a biaxial layout of a durability running test and running conditions.

DESCRIPTION OF EMBODIMENTS

An example of a belt with a protrusion according to an embodiment of the present invention will be described below with reference to the drawings.

First, an example of a conveying mechanism in which the belt with protrusions 1 of this embodiment is suitably used is described. The number of the belts with protrusions of this embodiment arranged in parallel is not limited to 2, and may be any as long as it is plural. An example in which two belts with protrusions are arranged in parallel is described below.

Figure 1:
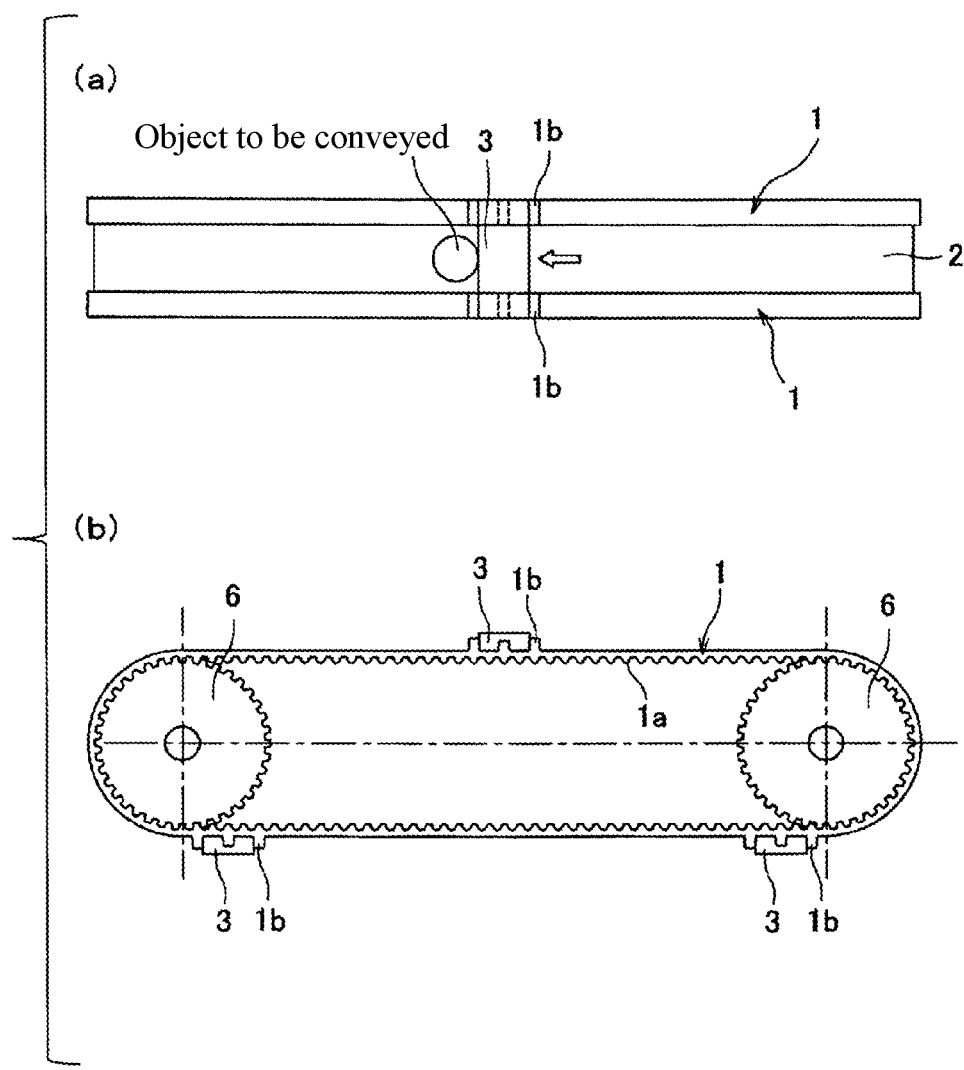

In FIG. 1, the conveying mechanism includes the two belts with protrusions 1 arranged in parallel, a conveying member 3 fitted and fixed to protruding portions 1b so as to bridge between two belts with protrusions 1 and pulleys 6, 6 on which the two belts with protrusions 1 are wound. The two belts with protrusions 1 are arranged in parallel on both sides of a conveying table 2 and constituted so as to be wound on the two pulleys 6, 6. Accordingly, the conveying member 3 pushes and transfers an object to be conveyed on the conveying table 2 while the two belts with protrusions 1 circulate in synchronization with rotation of the pulleys 6, 6. The pulleys 6, 6 are not limited to two pulleys, and a plurality of pulleys may be used. At least one of the pulleys is preferably a small diameter pulley having a diameter of 7.6 to 19.1 mm and a tooth number of 12 to 20 so that it can cope with space-saving of the conveying mechanism.

(Constitution of Belt with Protrusions)

Figure 2:
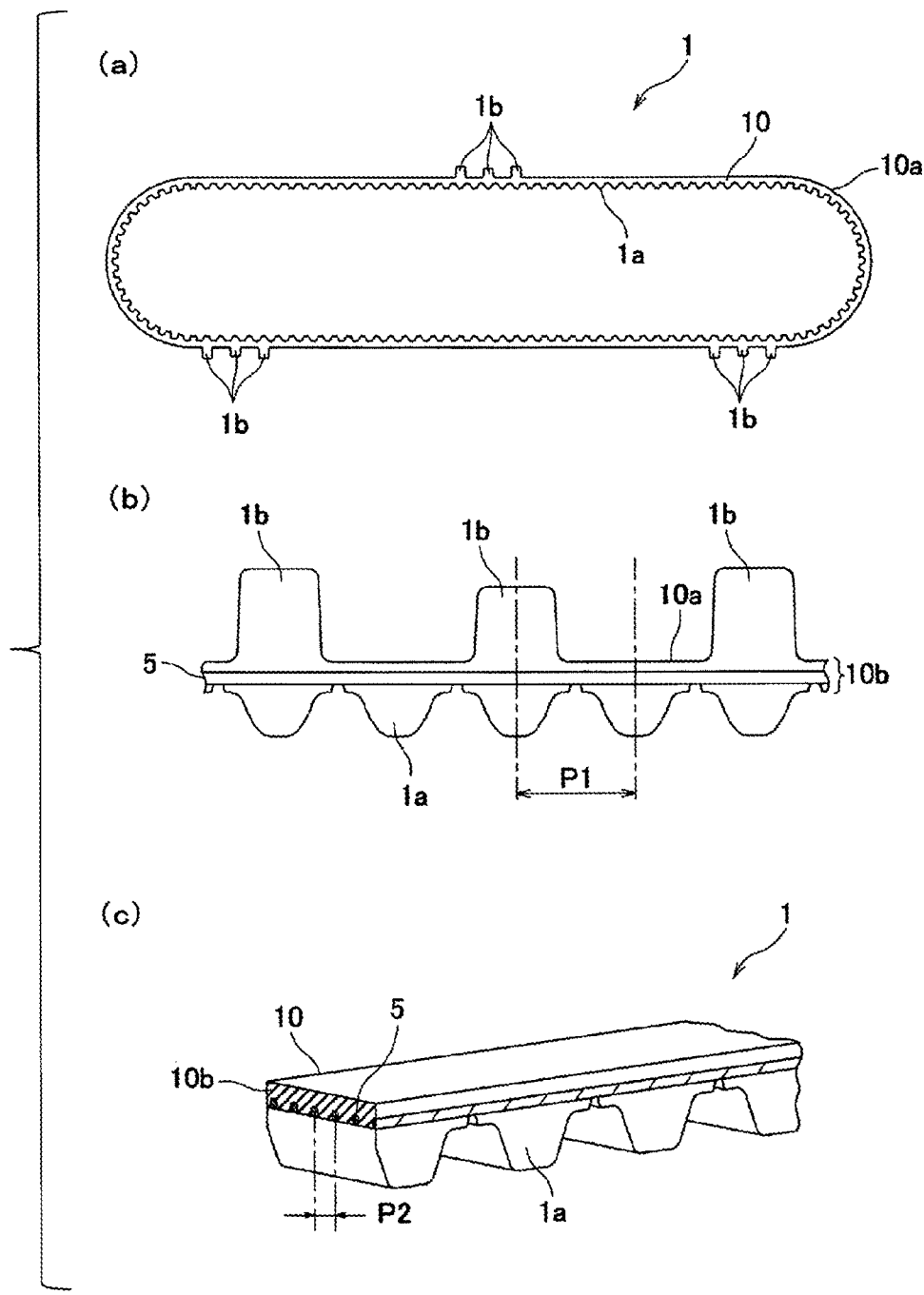

The belt with protrusions 1 includes an endless (annular) belt main body 10 and protruding portions 1b integrally formed on a back surface of the belt main body 10, as shown in (a) of FIG. 2.

The belt main body 10 is formed by an elastic material (for example, a thermosetting polyurethane elastomer), and is a toothed belt formed by cast molding or the like.

As shown in (b) of FIG. 2, a plurality of tooth portions 1a are provided at a predetermined tooth pitch P1 on an inner surface in a longitudinal direction of the belt with protrusions 1. The plurality of tooth portions 1a each extend in a width direction of the belt, and are arranged separately from each other at the predetermined tooth pitch P1 in the belt longitudinal direction.

As shown in (c) of FIG. 2, cords 5 extending in the longitudinal direction and arranged at a predetermined cord pitch P2 in the width direction are embedded in a back portion 10b of the belt main body 10.

As shown in (b) of FIG. 2, the plurality of protruding portions 1b are formed on the back surface 10a of the belt with protrusions 1. In this embodiment, the three protruding portions 1b for fitting and fixing the conveying member are provided at predetermined intervals in the belt longitudinal direction. The three protruding portions 1b are each arranged outside the belt tooth portions 1a, and separated from each other at an interval of one tooth portion 1a. The three protruding portions 1b may be separated from each other at an interval larger than or equal to one belt tooth portion 1a, but are arranged outside the tooth portion 1a.

The protruding portions 1b are provided on the back surface of the belt main body by an integral formation, and have the same length as that of the belt main body with respect to the belt width direction. In addition, the number of the protruding portions 1b is not limited to three, and any arbitrary number may be set. However, in this embodiment, the case of three protruding portions is described. Furthermore, the shape of the protruding portions 1b is not also particularly limited, and any arbitrary shape may be used.

Then, an example of embodiments of the cord, cord arrangement, protruding portion, belt main body, etc. are described below.

(Cord)

As a material for the cord, polyester fiber, aramid fiber, nylon fiber or the like is suitably used. Above all, the cord 5 is preferably formed by twisted yarns of the polyester fiber. The polyester fiber is excellent in dimension stability, bending fatigue resistance, etc., and durability to belt breakage is improved.

Figure 4:
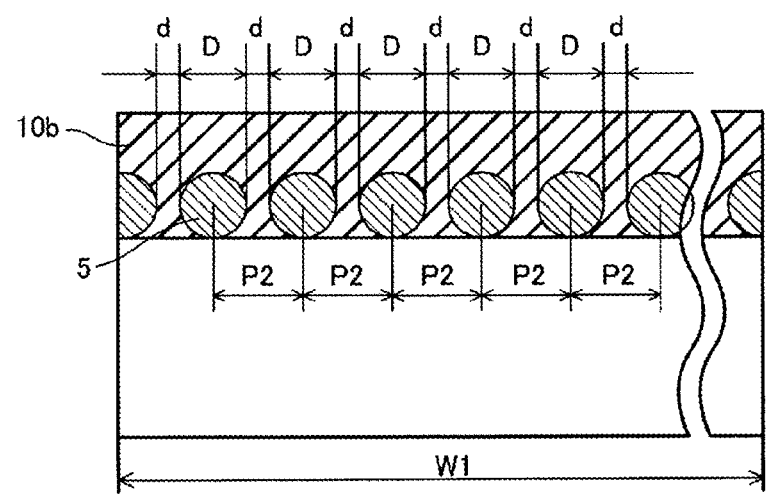
FIG. 4 is a partial cross-sectional view showing an arrangement state of cords.

The cords 5 are helically embedded in the back portion 10b at predetermined intervals (cord pitch) in the belt width direction along the belt longitudinal direction. In more detail, the cords 5 are arranged such that each cord pitch P2 which is a distance between centers of the adjacent cords helically embedded from one end to the other end in the belt width direction of the back portion 10b has a given value within a range of preferably 0.4 mm or more and 0.6 mm or less, and most preferably 0.45 mm or more and 0.55 mm or less, as shown in FIG. 4. Since the cords are helically embedded, the arrangement of the cords in a cross-sectional view is deviated in the width direction depending on a part of one endless belt. Therefore, the apparent number in a cross-sectional view of the cords arranged at the predetermined cord pitch in the belt width direction is regarded as "the number of cords". That is, the helical number of the cords helically embedded is taken as "the number of cords".

In order to cope with narrowing the belt width, the thin cords are used. Therefore, as for the fineness of the cords, the twisted yarns having a fineness of 900 to 1100 deniers, and most preferably 950 to 1050 deniers are used.

In order to obtain the thin cords, the cords having a diameter of preferably 0.33 to 0.37 mm and most preferably 0.34 to 0.36 mm can be used. In addition, as described above, the cord pitch P2 is preferably 0.4 to 0.6 mm and most preferably 0.45 to 0.55 mm (Cord Arrangement)

When the thin cords are used, the bending fatigue resistance is improved, but the elastic modulus is decreased. Then, the elastic modulus is secured by densely arranging the thin cords.

As an index showing the degree of this dense arrangement, the ratio of the total value of intervals d to the belt width W1 is used (see FIG. 4). This ratio can be calculated by the following formula 1. The smaller ratio shows that the cord arrangement is denser.

(Formula 1)

$$\text{Ratio of "total of intervals } d'' \text{ to belt width} = \\ (\text{"total of intervals } d''/\text{belt width}) \times 100 = \\ ((\text{belt width} - \text{"total of cord diameter"})/\text{belt width}) \times 100 \\ = ((\text{belt width} - (\text{cord diameter} \times \text{number of cords})) \\ /\text{belt width}) \times 100 * \text{number} \\ \text{of cords} = \text{belt width/cord pitch} = \\ ((\text{belt width} - (\text{cord diameter} \times \text{belt width/cord} \\ \text{pitch}))/\text{belt width}) \times 100 = \\ (1 - \text{cord diameter/cord pitch}) \times 100$$
(Formula 1)

The ratio specified by this Formula 1 is 12 to 45%, and most preferably 25 to 35%.

In addition to the ratio specified by this Formula 1, or instead thereof, the interval d between the adjacent cords can also be used. However, the degree of denseness varies depending on the diameter of the cords or the width of the belt, even when this interval d shows the same value. Therefore, the diameter D of the cords or the cord pitch P2 can also be used in combination (see FIG. 4).

The interval d between the adjacent cords is preferably 0.05 to 0.27 mm, and most preferably 0.1 to 0.2 mm.

The diameter D of the cords is preferably 0.33 to 0.37 mm, and most preferably 0.34 to 0.36 mm.

The cord pitch P2 is preferably 0.4 to 0.6 mm, and most preferably 0.45 to 0.55 mm (Protruding Portion)

In order to cope with the small diameter pulley (for example, the pulley diameter is 7.6 to 19.1 mm), the bendability and flexibility of the protruding portions are required. Therefore, the hardness of the protruding portions is 81 to 91 degrees (in accordance with JIS K6253:2012, measured with an A-type hardness meter), and most preferably 84 to 88 degrees.

Figure 3:
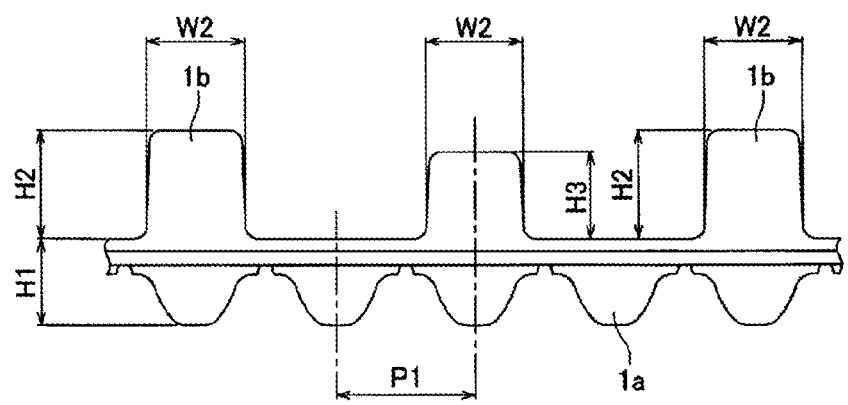
FIG. 3 is an enlarged view of the protruding portions of the belt with protrusions of FIG. 1.

In addition, the base width of the protruding portions 1b arranged outside the tooth portions 1a is preferably smaller than the tooth pitch P1 (see FIG. 3). This can be defined as the ratio of the base width W2 to the tooth pitch P1. That is, the ratio of the base width W2 to the tooth pitch P1 is preferably 66% or more and less than 100%, and most preferably 75 to 90%.

(Narrowing Belt Width)

When the cords 5 are thinned and the arrangement of the cords 5 is made dense, the bending fatigue resistance and the belt strength (resistance to jumping) are balanced with each other, thereby being able to narrow the belt width W1.

In addition, a balance between the bending fatigue resistance and the resistance against a load at the time of locking (protrusion strength and the resistance to jumping) is secured by setting the hardness of the protruding portion to a predetermined range (81 to 91, the most preferred range is 84 to 88) and making the base width of the protruding portion smaller than the tooth pitch. Furthermore, even when the width of the belt is narrowed, the protruding portion secures such hardness that a conveying member can be sufficiently firmly held. As a result, it is able to cope with narrowing the belt width.

That is, it is possible to cope with narrowing the width of the belt such that, for example, the belt has a width W1 of 3 to 5 mm and a tooth pitch P1 of 2 to 3 mm (Application to Small Diameter Pulley)

When the cords 5 are thinned and the arrangement of the cords 5 is made dense, the bending fatigue resistance and the belt strength (resistance to jumping) are balanced with each other, thereby being able to cope with decreasing the pulley diameter.

In addition, the resistance against the load at the time of locking (the protrusion strength and the resistance to jumping) and the bending fatigue resistance become balanced with each other by arranging the protruding portions 1b outside the belt tooth portions 1a, softening the hardness of the protruding portions 1b and making the base width of the protruding portions 1b smaller than the belt tooth pitch P1.

That is, in the case of decreasing the diameter of the pulley 6 for the space-saving in the conveying mechanism of FIG. 1, when the belt continues to rotate repeatedly in one direction while being bent and being wound on the pulley, the smaller the pulley diameter is, the larger the deformation stress is applied to the belt during bending. In particular, the deformation stress (compression stress) applied to the cords 5 (particularly, near an outer peripheral part) is large, and therefore, breakage of the belt due to bending fatigue of the cords 5 becomes liable to occur. The protruding portion 1b for fixing the conveying member 3 is formed on the back surface of the belt with protrusions 1, and in terms of being capable of sufficiently withstanding the load at the time of locking, the size or the strength of the protruding portion 1b is preferably larger. However, when a part where the protruding portion 1b is formed is wound on the pulley, it hardly becomes arcuate. Therefore, the cord 5 in a base portion of the protruding portion 1b becomes much more liable to suffer from buckling and breakage. This tendency is remarkable when the protruding portion 1b is rigid or the protrusion base width is large, and the bending fatigue of the cord 5 is accelerated.

Accordingly, it becomes possible to wind the belt on the small diameter pulley by making the protruding portion 1b excellent in bendability and flexible.

That is, for example, the belt is wound on the small diameter pulley having a pulley diameter of 7.6 to 19.1 mm and a pulley tooth number of 12 to 20.

Advantageous Effects of Embodiment

Even when the belt with protrusions 1 is applied to the small diameter pulley and the belt width is narrowed, thereby coping with the space-saving of the conveying mechanism by employing this embodiment, the well-balanced belt with protrusions which can achieve both the bending fatigue resistance and the resistance against the load at the time of locking (the protrusion strength and the resistance to jumping) is obtained.

In the belt with protrusions 1 of this embodiment, when it is intended to cope with the space-saving of the conveying mechanism by decreasing the diameter of the pulley 6, the bending fatigue resistance of the belt with protrusions 1 can be prevented from being decreased, and also the resistance against the load at the time of locking (the protrusion strength and the resistance to jumping) can be prevented from being decreased. Accordingly, there can be provided the belt with protrusions 1 which copes with the space-saving and is optimally designed to obtain the well-balanced belt for being durably used in repeated conveyance.

(Thermosetting Polyurethane Elastomer)

The desired hardness of the belt main body and the protruding portion can be obtained, for example, by adjusting the blending described below.

That is, the thermosetting polyurethane elastomer for forming the belt with protrusions 1 can be obtained by thermally curing a prepolymer obtained from a polyol and a polyisocyanate and a curing agent. Alternatively, it can be obtained by thermally curing a polyol, a polyisocyanate and a curing agent. The thermosetting polyurethane elastomer is blended such that the NCO index value (isocyanate group/active hydrogen group) which is a ratio of mol equivalent is within a range of 0.8 to 1.0. The isocyanate group is an isocyanate group of the prepolymer or the polyisocyanate. The active hydrogen group is an active hydrogen group of the polyol and the curing agent, an active hydrogen group of the polyol, or an active hydrogen group of the curing agent.

The polyol is not limited to one having two or more hydroxyl groups in a molecule. As the polyol, for example, a polyether polyol, a polyester polyol, a polylactone-based polyester polyol, a polycarbonate polyol, a polyolefin polyol, etc. may be used either alone or in combination of two or more thereof.

The polyether polyol is polyethylene glycol, polypropylene glycol, polytetramethylene ether glycol or the like.

Here, the polyester polyol can be obtained by reacting a dicarboxylic acid compound with a polyol compound. Examples of the dicarboxylic acid compounds include adipic acid, sebacic acid, itaconic acid, maleic acid anhydride, terephthalic acid, isophthalic acid, fumaric acid, succinic acid, oxalic acid, malonic acid, glutaric acid, pimelic acid, suberic acid, and azelaic acid. Examples of the polyol compounds include ethylene glycol, diethylene glycol, 1,4-butanediol, 1,6-hexanediol, neopentyl glycol, 1,2-propanediol, 1,3-propanediol, 1,9-nonanediol, 3-methyl-1,5-pentanediol, tripropylene glycol, trimethylolpropane, and glycerol.

The polylactone-based polyester polyol is polycaprolactone polyol, poly-β-methyl-δ-valerolactone, or the like. The polycarbonate polyol can be obtained by reacting a diol compound with a carbonate compound. Examples of the diol compounds include 1,3-propanediol, 1,4-butanediol, 1,6-hexanediol, diethylene glycol, polyethylene glycol, polypropylene glycol, and polytetramethylene glycol. The carbonate compound is phosgene, dialkyl carbonate, or diphenyl carbonate.

The polyolefin polyol is polybutadiene polyol, polyisoprene polyol or the like.

As the polyol, the polyether polyol is particularly preferred. The polyether-based thermosetting urethane formed from the polyether polyol has excellent hydrolysis resistance, compared to the polyester-based polyurethane formed from the polyester polyol, and therefore, has reduced deterioration with time and excellent durability even when used for a long period of time.

As the polyol, a low molecular weight polyol may be used together. Examples of the low molecular weight polyols include an aliphatic diol such as ethylene glycol, 1,2-propanediol, 1,3-propanediol, 2-methyl-1,3-propanediol, 2-butyl-2-ethyl-1,3-propanediol, 1,3-butanediol, 1,4-butanediol, neopentyl glycol (2,2-dimethyl-1,3-propanediol), 2-isopropyl-1,4-butanediol, 3-methyl-2,4-pentanediol, 2,4-pentanediol, 1,5-pentanediol, 3-methyl-1,5-pentanediol, 2-methyl-2,4-pentanediol, 2,4-dimethyl-1,5-pentanediol, 2,4-diethyl-1,5-pentanediol, 1,5-hexanediol, 1,6-hexanediol, 2-ethyl-1,3-hexanediol, 2-ethyl-1,6-hexanediol, 1,7-heptanediol, 3,5-heptanediol, 1,8-octanediol, 2-methyl-1,8-octanediol, 1,9-nonanediol or 1,10-decanediol; an alicyclic diol such as cyclohexanedimethanol (for example, 1,4-cyclohexanedimethanol), cyclohexanediol (for example, 1,3-cyclohexanediol or 1,4-cyclohexanediol) or 2-bis(4-hydroxycyclohexyl)-propane; and a trivalent or higher polyol such as trimethylolethane, trimethylolpropane, a hexitol, a pentitol, glycerol, polyglycerol, pentaerythritol, dipentaerythritol or tetramethylolpropane.

As the polyisocyanate, for example, an aromatic isocyanate, an aliphatic polyisocyanate, an alicyclic polyisocyanate, a carbodiimide-modified polyisocyanate of each polyisocyanate described above, an isocyanurate-modified polyisocyanate of each polyisocyanate described above, etc. may be used either alone or in combination of two or more thereof.

Examples of the aromatic isocyanates include 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), polymethylene polyphenylene polyisocyanate, tolidine diisocyanate (TODI), and 1,5-naphthalene diisocyanate (NDI).

Examples of the aliphatic polyisocyanates include hexamethylene diisocyanate (HDI), trimethylhexamethylene diisocyanate (TMHDI), lysine diisocyanate, and norbornene diisocyanatomethyl (NBDI).

Examples of the alicyclic polyisocyanates include trans-cyclohexane-1,4-diisocyanate, isophorone diisocyanate (IPDI), hydrogenated xylylene diisocyanate (H6XDI, hydrogenated XDI), and dicyclohexylmethane diisocyanate (H12MDI, hydrogenated MDI).

The curing agent is usually used in forming the thermosetting polyurethane elastomer. The kind of the active hydrogen group of the curing agent is, for example, a hydroxyl group, an amino group, an imino group, a carboxyl group, a urethane group, a thiol group, an epoxy group or the like. Specifically, as the curing agent, there may be used 4,4'-methylenebis(o-chloroaniline) (MOCA), 4,4'-methylenedianiline (MDA) or the like.

(Production Method of Belt with Protrusions)

The protruding portions formed integrally with the belt main body are obtained, for example, by a cast molding method described below.

That is, in a casting mold apparatus (mold) including an inner mold and an outer mold, a polyurethane raw material (liquid) for forming the tooth portion-containing belt main body and the protruding portions is cast into a cavity in a state where the cord is wound on the inner mold, and thereafter solidified to prepare a sleeve-shaped formed body in which the tooth portion-containing belt main body and the protruding portions are integrated with each other, and this formed body is cut into a predetermined width to produce the belt with protrusions. Specific description is made below.

First, a structure of the casting mold apparatus is described. The casting mold apparatus includes the cylindrical outer mold and the columnar inner mold to be inserted into the outer mold, and has a space part to be filled with the liquid thermosetting polyurethane raw material between the outer mold and the inner mold. Then, a protrusion forming part for forming convex part-containing protrusions provided on the back surface side of the belt portion in the toothed belt is provided on an inner peripheral surface of the outer mold along a cylindrical axis direction of the outer mold. In addition, a tooth portion forming part for forming the plurality of tooth portions arranged at a predetermined pitch on the belly surface side of the belt portion is recessed on an outer peripheral surface of the inner mold along the cylindrical axis direction.

Subsequently, a production method of the toothed belt using the casting mold apparatus described above is described. First, the inner mold on which the cord is helically wound beforehand is inserted into the outer mold. Next, the liquid polyurethane raw material is cast into the space part between the outer mold and the inner mold. Then, cross-linking is performed under a temperature condition of about 100 to 120° C. taking a time of 10 to 20 minutes. When the thermosetting polyurethane cast into the space part is solidified by cross-linking, the outer mold and the inner mold are separated from each other, and the belt formed body is detached from the casting mold apparatus. Thereafter, the belt formed body is cut to produce the belt with protrusions.

Although the preferred embodiments of the present invention have been described above, the present invention should not be limited to the above-described embodiments, and it is possible to make various changes within the scope described in the claims.

EXAMPLE

First Example

A specific example of the present invention is described below.

Belts with protrusions as described in Examples 1 to 9 and Comparative Examples 1 to 3 shown below were formed and subjected to evaluation tests.

In Examples 1 to 9 and Comparative Examples 1 to 3, the fineness (denier) with respect to the thinness of cords is used as a variable, and further, the cord pitch P2 relating to the density of cord arrangement is used as a variable.

Specifically, in Examples 1 to 3, the fineness was 900 deniers, and the cord pitch P2 (mm) was changed as 0.4, 0.5 and 0.6. In Examples 4 to 6, the fineness was 1000 deniers, and the cord pitch P2 (mm) was changed as 0.4, 0.5 and 0.6. In Examples 7 to 9, the fineness was 1100 deniers, and the cord pitch P2 (mm) was changed as 0.45, 0.5 and 0.6. In Comparative Examples 1 and 2, the fineness was diverged downward to be 630 deniers, and in Comparative Example 3, the cord pitch P2 was diverged upward to be 0.7.

Other common items for a belt main body are as follows.
Belt width (W1): 4.0 mm,
Total belt thickness (H1) (excluding protruding portions): 1.94 mm,
JIS-A hardness: 85 degrees (protruding portions also has the same hardness),
Belt peripheral length: 600 mm,
Tooth form: S3M,
Tooth pitch (P1): 3.0 mm,
Tooth height: 1.14 mm,
Constituent material: Ether-based thermosetting polyurethane elastomer composition.

Items for protruding portions are as follows, referring to FIG. 3.
Protruding portion height (H2): 2.5 mm,
Protruding portion height (H3): 2.0 mm,
Protruding portion base width (W2): 2.5 mm
Specifications of cords are as described in Table 1.

The belts with protrusions 1 of Examples 1 to 9 and Comparative Examples 1 to 3 were prepared by the above-described production methods, and these belts with protrusions 1 were subjected to a tensile test and a durability running test.

(Tensile Test)

A protruding portion-containing test piece having a width of 4 mm and a length of 200 mm was collected from each of the belts of Examples 1 to 9 and Comparative Examples 1 to 3, and the tensile test (tensile speed: 50 mm/min) was performed for each test piece using a tensile tester (Autograph AG-1) under an atmospheric temperature of 23° C. to measure strength until breakage of a protrusion base portion. The measurement results are shown in "Strength (before running)" of Table 1 as belt strength before running of the durability running test.

(Durability Running Test)

Using each of the belts of Examples 1 to 9 and Comparative Examples 1 to 3, the durability running test was performed by a biaxial layout shown in (a) of FIG. 5 and under running conditions shown in (b) of FIG. 5. The observation results of failure of each belt in running are shown in Table 1. In addition, using each belt after running, the above-described tensile test was performed again under an atmospheric temperature of 23° C. The results thereof are shown in "Strength (after running)" of Table 1 as belt strength after running.

In Table 1, belt strength retention was calculated from the strengths of each belt before and after running, and evaluated by ○ and x as judgment of bending fatigue resistance. The belt having a strength retention of 63% or more was evaluated as ○, and regarded as having no practical problem, and the belt having a strength retention of less than 63% was evaluated as x. In addition, the failure of the belt in running was observed, and the case where a defect such as tooth chipping, cracking of the protrusion base portion, cracks of a back surface or jumping occurred was evaluated as x.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Cord | Material | Polyester | | | | | | |
| | Fineness (denier) | 900 | | | 1000 | | | 1100 |
| | Twist configuration | 300d/1 × 3 | | | 250d/1 × 4 | | | 275d/1 × 4 |
| | Twist coefficient | (secondary) 3.0, (primary) 3.0 | | | (secondary) 3.0, (primary) 3.0 | | | (secondary) 3.0, (primary) 3.0 |
| | Cord diameter D (mm) | 0.33 | | | 0.35 | | | 0.37 |
| | Cord pitch P2 (mm) | 0.4 | 0.5 | 0.6 | 0.4 | 0.5 | 0.6 | 0.45 |
| Cord arrangement | Interval between adjacent cords d (mm) | 0.07 | 0.17 | 0.27 | 0.05 | 0.15 | 0.25 | 0.08 |
| | Ratio of total of intervals d to belt width | 17.5% | 34.0% | 44.7% | 12.5% | 30.0% | 41.4% | 17.7% |
| Belt | Belt width W1 (mm) | 4 | | | | | | |
| | Protrusion base width W2 (mm) | 2.5 | | | | | | |
| | Tooth Pitch P1 (mm) | 3.0 | | | | | | |
| | Hardness | 85 | | | | | | |
| | Strength Before running | 120 N/mm | 97 N/mm | 81 N/mm | 129 N/mm | 105 N/mm | 86 N/mm | 121 N/mm |
| | After running | 78 N/mm | 69 N/mm | 51 N/mm | 85 N/mm | 71 N/mm | 55 N/mm | 77 N/mm |
| | Retention | 65% | 71% | 63% | 66% | 68% | 64% | 64% |
| | Bending fatigue resistance judgment | ○ | ○ | ○ | ○ | ○ | ○ | ○ |
| | Failure in running | ○ | ○ | ○ | ○ | ○ | ○ | ○ |

| | | Ex. 8 | Ex. 9 | Comp. Ex. 1 | Comp. Ex. 2 | Comp. Ex. 3 |
|---|---|---|---|---|---|---|
| Cord | Material | Polyester | | | | |
| | Fineness (denier) | | | 630 | | 1100 |
| | Twist configuration | | | 210d/1 × 3 | | 275d/1 × 4 |
| | Twist coefficient | | | (secondary) 3.0, (primary) 3.0 | | (secondary) 3.0, (primary) 3.0 |
| | Cord diameter D (mm) | | | 0.27 | | 0.37 |
| | Cord pitch P2 (mm) | 0.5 | 0.6 | 0.35 | 0.5 | 0.7 |
| Cord arrangement | Interval between adjacent cords d (mm) | 0.13 | 0.23 | 0.08 | 0.23 | 0.33 |
| | Ratio of total of intervals d to belt width | 26.0% | 38.0% | 23.1% | 46.0% | 47.3% |
| Belt | Belt width W1 (mm) | | | 4 | | |
| | Protrusion base width W2 (mm) | | | 2.5 | | |
| | Tooth Pitch P1 (mm) | | | 3.0 | | |
| | Hardness | | | 85 | | |
| | Strength Before running | 110 N/mm | 88 N/mm | 109 N/mm | 76 N/mm | 72 N/mm |
| | After running | 73 N/mm | 55 N/mm | 51 N/mm | 31 N/mm | 41 N/mm |
| | Retention | 66% | 63% | 47% | 40% | 57% |
| | Bending fatigue resistance judgment | ○ | ○ | X | X | X |
| | Failure in running | ○ | ○ | X Tooth chipping | X Jumping | X Jumping |

According to Table 1, in Examples 1 to 9 in which a cord fineness (thinness) of 900 to 1100 deniers and a cord pitch P2 (dense arrangement) of 0.4 to 0.6 mm were applied and "the ratio of "the total value of intervals d" to the belt width" fell in the proper range of 12 to 45%, each belt was excellent in the bending fatigue resistance and ran without failure.

In Comparative Example 2, the cords were too thin to satisfy the belt strength, and the belt was slightly extended during running to cause the occurrence of engagement failure (jumping: tooth skipping).

Also in Comparative Example 1, the cords were too thin. However, since the cords were arranged more densely (cord pitch: 0.35 mm) than in Comparative Example 2, jumping failure did not occur, but the engagement failure occurred due to extension caused by insufficient strength to cause the occurrence of tooth chipping.

In Comparative Example 3, the cords having the same thickness as in Examples 7 to 9 were used. However, the cord pitch P2 was large (0.7 mm), and therefore, "the ratio of "the total value of intervals d" to the belt width" exceeded the upper limit value 45% to cause the occurrence of the engagement failure (jumping: tooth skipping) due to extension caused by insufficient belt strength.

Second Example

A second specific example of the present invention is described below.

For Example 5 showing approximately center values among Examples 1 to 9 in Table 1, the hardness was changed.

Specifically, the hardness of 85 degrees in Example 5 was changed to 81 degrees as the lower limit of the proper range in Example 10, and changed to 91 degrees as the upper limit of the proper range in Example 11. The hardness was diverged downward in Comparative Example 4, and diverged upward in Comparative Example 5.

These were subjected to the same tensile test and durability running test, and the results thereof are shown in Table 2.

According to Table 2, in Examples 10 and 11 in which the hardness of the polyurethane elastomer composing the belt main body (tooth portions and a back portion) and the protruding portions was 81 to 91 degrees, each belt was excellent in the bending fatigue resistance and ran without failure.

On the other hand, in Comparative Example 4, since the hardness is too small, wear or tooth chipping occurred at the tooth portion in contact with a pulley during running. In Comparative Example 5, since the hardness is too large, the whole belt was hard, and bendability was deteriorated. Therefore, cracks occurred on a belt back surface.

Third Example

A third specific example of the present invention is described below.

For Example 5 showing approximately center values among Examples 1 to 9 in Table 1, the base width W2 of the protruding portions was changed.

Specifically, in contrast with Example 5 having the base width W2 of 2.5 mm, the base width W2 was 2.2 mm in Example 12. In Comparative Example 6, the base width W2 was 3.0 mm (the same as 3.0 mm of the tooth pitch P1), and, in Comparative Example 7, the base width W2 was further widened to 3.7 mm.

These were subjected to the same tensile test and durability running test, and the results thereof are shown in Table 3.

TABLE 2

Comparison made by changing hardness (81 to 91 degrees)

| | | Ex. 10 | Ex. 5 | Ex. 11 | Comp. Ex. 4 | Comp. Ex. 5 |
|---|---|---|---|---|---|---|
| Cord | Material | | Polyester | | Polyester | |
| | Fineness (denier) | | 1000 | | 1000 | |
| | Cord diameter D (mm) | | 0.35 | | 0.35 | |
| | Cord pitch P2 (mm) | | 0.5 | | 0.5 | |
| Cord arrangement | Interval between adjacent cords d (mm) | | 0.15 | | 0.15 | |
| | Ratio of total of intervals d to belt width | | 30.0% | | 30.0% | |
| Belt | Belt width W1 (mm) | | 4 | | 4 | |
| | Protrusion base width W2 (mm) | | 2.5 | | 2.5 | |
| | Tooth pitch P1 (mm) | | 3.0 | | 3.0 | |
| | Hardness | 81 | 85 | 91 | 75 | 93 |
| | Strength Before running | 102 N/mm | 105 N/mm | 107 N/mm | 96 N/mm | 110 N/mm |
| | After running | 67 N/mm | 71 N/mm | 70 N/mm | 58 N/mm | 69 N/mm |
| | Retention | 66% | 68% | 65% | 60% | 63% |
| | Bending fatigue resistance judgment | ○ | ○ | ○ | ○ | ○ |
| | Failure in running | ○ | ○ | ○ | X Tooth chipping Tooth portion wear | X Back surface cracks |

TABLE 3

Comparison made by changing base width of protruding portions (smaller than tooth pitch)

|  |  | Ex. 12 | Ex. 5 | Comp. Ex. 6 | Comp. Ex. 7 |
|---|---|---|---|---|---|
| Cord | Material | Polyester | | Polyester | |
|  | Fineness (denier) | 1000 | | 1000 | |
|  | Cord diameter D (mm) | 0.35 | | 0.35 | |
|  | Cord pitch P2 (mm) | 0.5 | | 0.5 | |
| Cord arrangement | Interval between adjacent cords d (mm) | 0.15 | | 0.15 | |
|  | Ratio of total of intervals d to belt width | 30.0% | | 30.0% | |
| Belt | Belt width W1 (mm) | 4 | | 4 | |
|  | Protrusion base width W2 (mm) | 2.2 | 2.5 | 3.0 | 3.7 |
|  | Ratio of base width to tooth pitch | 73% | 83% | 100% | 123% |
|  | Tooth pitch P1 (mm) | 3.0 | | 3.0 | |
|  | Hardness | 85 | | 85 | |
|  | Strength  Before running | 103 N/mm | 105 N/mm | 104 N/mm | 105 N/mm |
|  | After running | 68 N/mm | 71 N/mm | 62 N/mm | 53 N/mm |
|  | Retention | 66% | 68% | 60% | 50% |
|  | Bending fatigue resistance judgment | ○ | ○ | X | X |
|  | Failure in running | ○ | ○ | X Back surface cracks | X Back surface cracks |

According to Table 3, in Example 2 (W2=2.5 mm; 83%) and Example 3 (W2=2.2 mm; 73%) in which the base width W2 of the protruding portions was smaller than the tooth pitch P1 (3.0 mm), each belt was excellent in the bending fatigue resistance and ran without failure.

In Comparative Example 6 (W2=3.0 mm; 100%) and Comparative Example 7 (W2=3.7 mm; 123%), since the base width was too large, the belt could not be wound on a pulley in the state of following an outer peripheral shape thereof. Therefore, large deformation stress was applied to a belt back surface, which caused the occurrence of cracks on the back surface.

While the present invention has been described in detail with reference to specific embodiments thereof, it will be apparent to those skilled in the art that various modifications and changes can be made without departing from the spirit and scope of the present invention.

This application is based on Japanese Patent Application No. 2017-129812 filed on Jun. 30, 2017 and Japanese Patent Application No. 2018-120775 filed on Jun. 26, 2018, the contents of which are incorporated herein by reference.

REFERENCE SIGNS LIST

1: Belt with protrusions
1a: Tooth portion
1b: Protruding portion
3: Conveying member
5: Cord
6: Pulley
10: Belt main body

The invention claimed is:

1. A belt with a protrusion, comprising:
a belt main body comprising tooth portions at a predetermined tooth pitch on an inner surface of the belt in a longitudinal direction, and a cord extending in the longitudinal direction and arranged at a predetermined cord pitch in a width direction which is embedded in a back portion thereof; and
a protruding portion formed on a back surface of the belt main body by an integral formation,
wherein the cord has a fineness of 900 to 1100 deniers, and a ratio of a total of intervals between adjacent cords to a belt width of 12 to 45%,
wherein the protruding portion is arranged outside the tooth portions, has a hardness of 81 to 91 degrees in accordance with Japanese Industrial Standard (JIS) K6253:2012, measured with an A-type hardness meter, and has a base width smaller than the tooth pitch, and
wherein the cord comprises a polyester fiber.

2. The belt with a protrusion according to claim 1,
wherein the cord has a diameter of 0.33 to 0.37 mm; the cord pitch is 0.4 to 0.6 mm, and
wherein the interval between the adjacent cords is 0.05 to 0.27 mm.

3. The belt with a protrusion according to claim 1, wherein the belt width is 3 to 5 mm, and the tooth pitch is 2 to 3 mm.

4. The belt with a protrusion according to claim 1, having a ratio of the base width to the tooth pitch of 66% or more and less than 100%.

5. A conveying mechanism comprising:
two or more belts with a protrusion according to claim 1 arranged in parallel;
a conveying member fitted and fixed to the protruding portions so as to bridge between the two or more belts with a protrusion; and
a pulley on which the two or more belts with a protrusion are wound,
wherein the conveying mechanism is configured such that the conveying member pushes and transfers an object to be conveyed while the two or more belts with a protrusion circulate in synchronization with a rotation of the pulley.

6. The conveying mechanism according to claim 5, wherein the pulley comprises a pulley having a diameter of 7.6 to 19.1 mm and a number of teeth of 12 to 20.

7. The belt with a protrusion according to claim 1, wherein the protruding portion is aligned, in the longitudinal direction of the belt, with a center of a toothed portion.

\* \* \* \* \*